United States Patent
Rollmann et al.

[11] 4,324,651
[45] Apr. 13, 1982

[54] DEASPHALTING PROCESS

[75] Inventors: Louis D. Rollmann, Princeton, N.J.; Dennis E. Walsh, Richboro, Pa.

[73] Assignee: Mobil Oil Corporation, New York, N.Y.

[21] Appl. No.: 214,602

[22] Filed: Dec. 9, 1980

[51] Int. Cl.³ .................. C10C 3/00; C10G 21/16
[52] U.S. Cl. ....................... 208/309; 208/45
[58] Field of Search ............... 208/45, 86, 180, 309

[56] References Cited

U.S. PATENT DOCUMENTS 1,766,768  6/1930  Werkentnin ............... 208/180
2,500,757  3/1950  Kiersted, Jr. ............. 208/309
2,669,538  2/1954  Yurasko et al. ........... 208/45
4,125,458  11/1978  Busnell et al. ........... 208/309

Primary Examiner—Delbert E. Gantz
Assistant Examiner—G. Caldarola
Attorney, Agent, or Firm—Charles A. Huggett; Michael G. Gilman; Charles J. Speciale

[57] ABSTRACT

An asphalt-containing mineral oil can be deasphalted at temperatures above about 80° C. with methanol serving as the deasphalting solvent. Two liquid phases are produced, an asphalt-rich phase and a methanol-rich phase. By cooling the methanol-rich phase to a temperature below 80° C., two additional liquid phases are produced, an oil-rich phase and a methanol-rich phase.

11 Claims, 1 Drawing Figure

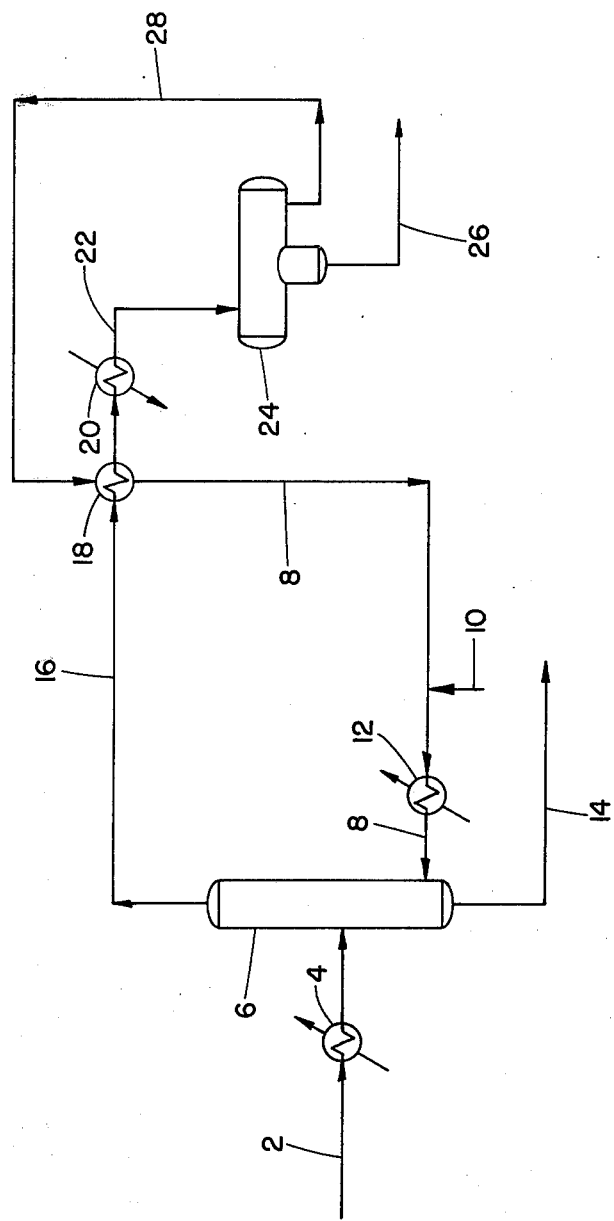

DEASPHALTING PROCESS

BACKGROUND OF THE INVENTION

1. Field of the Invention

This invention relates to a process of deasphalting an asphalt-containing mineral oil. More particularly, it relates to a process for obtaining a hydrocarbon oil with a low asphalt content. This invention especially relates to solvent deasphalting an asphalt-containing hydrocarbon feedstock with a liquid solvent.

2. Description of the Prior Art

Many petroleum crude oils contain significant quantities of asphalt. Asphalts have a boiling range which coincides with that of many of the higher boiling constituents of petroleum. Since asphalts readily oxidize to form carbon and sludge, their presence is undesirable in lubricating oils. Further, due to their high coking propensity asphalts must be excluded from fluid catalytic cracking units where high coke levels are detrimental to catalyst performance.

Solvent deasphalting has proven effective in providing low asphalt-content petroleum fractions and has been practiced commercially for many years. In these deasphalting processes, the oil dissolves in the selected solvent while the asphalt, which is present in a dispersed state in the mineral oil, precipitates during the solvent treatment. Propane deasphalting has proven to be one of the most commercially successful of these processes, especially in the preparation of high quality lubricating oils.

The prior art is replete with solvent deasphalting processes employing a variety of solvents and solvent mixtures. Typical of this prior art in U.S. Pat. No. 2,337,448 of Carr which discloses a process for deasphalting a heavy residuum by contacting it at elevated temperatures with a deasphalting solvent such as ethane, ethylene, propane, propylene, butane, butylene, isobutane or mixtures thereof. A number of other solvents and solvent combinations are disclosed in the patent art as being useful in solvent deasphalting, including a two or three component solvent selected from hydrogen sulfide, carbon dioxide and $C_3$–$C_5$ hydrocarbons (U.S. Pat. No. 4,191,639 of Audeh et al.), propylene-acetone (U.S. Pat. No. 3,975,396 of Bushnell et al.) and naphtha or $C_3$–$C_5$ hydrocarbons together with small amounts of ethane, ethylene, alcohols, esters or ketones (U.S. Pat. No. 2,045,742 of Winning et al.). U.S. Pat. Nos. 3,206,388 and 3,228,870 of Pitchford disclose the effectiveness of n-propyl alcohol or isopropyl alcohol containing a small quantity of water or a larger quantity of $C_5$–$C_{15}$ n-paraffin as a deasphalting solvent for either a crude oil or a fraction thereof.

Bray et al. (U.S. Pat. Nos. 2,081,473 and 2,101,308) and Bray (U.S. Pat. No. 1,949,989) teach a wide range of solvents that will dissolve the oil and any wax in the oil but will not dissolve the asphalt. This extensive list includes liquified normally gaseous $C_2$–$C_4$ hydrocarbons, naphtha, and casinghead gasoline, as well as alcohol, ether, mixtures of alcohol and ether, acetone and the like. Only the preferred liquified $C_2$–$C_4$ hydrocarbons are exemplified, however.

$C_1$–$C_4$ alcohols were employed in U.S. Pat. No. 3,364,138 of Van Lookeren Campagne to remove the resins from an oil-solvent solution after the asphalt had been precipitated from a residual petroleum stock by propane. Solvent extraction of the resins from asphalt by the use of alcohols was also the subject of U.S. Pat. No. 3,003,946 of Garwin ($C_3$–$C_4$ aliphatic alcohols) and U.S. Pat. No. 2,726,192 of Kieras (n-butanol).

Solvent refining of coal tars often has involved the use of alcohols. In U.S. Pat. No. 3,079,326 of Neuworth, a double solvent extraction is employed. Aqueous methanol dissovles the acidic portion of the coal tar and then naphtha removes the neutral oils leaving a solid pitch phase. A solvent mixture of an aliphatic ketone and a lower alcohol, both having no more than six carbon atoms, (U.S. Pat. No. 1,905,423 of Rhodes et al.) as well as ethanol alone (U.S. Pat. No. 1,674,710 of Wittek) have also been employed to solvent extract coal tars. Methanol, alone, (U.S. Pat. No. 1,327,271 of Comber et al.) or as an aqueous solution (U.S. Pat. No. 3,153,626 of Kulik) has also found utility in coal tar extraction.

Although alcohols are disclosed broadly in the prior art as deasphalting solvents, only the propanols are specifically exemplified as having the ability to precipitate asphalt from the mineral oil while concomitantly dissolving the mineral oil. On the other hand, $C_1$–$C_4$ alcohols and mixtures thereof when added to a deasphalted oil-solvent solution act as an anti-solvent precipating the resins. The only use of methanol (alone or with water) for the direct treatment of heavy carbonaceous materials in the prior art is to solvent extract coal tar. No specific use of methanol as a deasphalting solvent is disclosed.

The use of methanol as a deasphalting solvent for mineral oils may provide processing advantages not realized heretofore and this is the object of this invention.

SUMMARY OF THE INVENTION

In accordance with the present invention, it has been found that an asphalt-containing mineral oil can be effectively deasphalted with methanol. More particularly, it has been found that at temperatures above 80° C. methanol will selectively dissolve the oils in an asphalt-containing mineral oil producing two liquid phases, an oil-rich phase and an asphalt-rich phase and that, upon removing the oil-rich phase and cooling it to below 80° C., two liquid phases will form, an oil-rich alcohol-lean phase and an alcohol-rich phase. Thus, the temperature employed in the process is a critical feature of this invention. Subsequently, the oil-rich phase and the asphalt-rich phase may be processed as required to provide the finished products for which the oil and the asphalt are particularly useful.

The process of this invention is described as a process for deasphalting an asphalt-containing mineral oil which comprises:

(a) contacting an asphalt-containing mineral oil at a pressure and a temperature greater than about 80° C. with an amount of methanol effective to form two liquid phases, a deasphalted oil phase comprising a major amount of the methanol and an asphalt phase comprising a minor amount of the methanol, said pressure and said temperature being effective to maintain the methanol in the liquid phase, (b) separating the two phases, and (c) maintaining the deasphalted oil phase at a temperature less than about 80° C. for a period of time sufficient to form two liquid phases, a methanol phase and a second deasphalted oil phase comprising a minor amount of methanol, said pressure and said temperature being effective to maintain the methanol in the liquid phase.

BRIEF DESCRIPTION OF THE DRAWING

FIG. 1 is a schematic flowplan of an embodiment of the invention.

DESCRIPTION OF THE PREFERRED EMBODIMENT

The present invention relates to a process for deasphalting an asphalt-containing mineral oil utilizing methanol as the solvent. Briefly, this invention may be described as adding methanol to an asphalt-containing mineral oil, maintaining the mixture at a temperature above 80° C. whereby the methanol acts as a solvent for a portion of the oil forming two liquid phases, an oil-rich phase and an asphalt-rich phase. The phases are separated and the temperature of the oil-rich phase is reduced to below 80° C. whereby another two phases form, an alcohol-rich oil-lean phase and an oil-rich phase. The methanol-rich phase is recovered and may be recycled, as is, for reuse in the process. The oil-rich phase and the asphalt-rich phase are each sent to further processing depending upon the downstream use of the oil and the asphalt. For example, the oil phase could, depending on its crude source and its ultimate end-use, serve as a feedstock to a fluid catalytic cracking unit or a lubricating oil solvent extraction unit. If the asphalt in the asphalt phase is of proper quality, this stream could be sent to an asphalt manufacturing unit. Where the asphalt recovered is unsatisfactory for finished asphalt products, it may serve as fuel or coker feed. The recovered oil phase usually contains minor quantities of methanol and, perhaps, some asphalt while the recovered asphalt phase usually contains minor quantities of methanol and a not insignificant amount of oil since the asphalt phase may comprise from 33 to 67% of the initial feed. (All percentages and parts referred to herein are by weight, unless otherwise indicated.) Where it is desirable to remove the traces of methanol and asphalt from the recovered oil phase or the methanol and the oil from the recovered asphalt phase, such techniques as flash vaporization and/or steam stripping which are well known in the solvent deasphalting art may be employed.

The process of this invention is particularly suitable for removing asphalt from any mineral oil feed stock which contains significant quantities of asphalt. Useful mineral oil feed stocks for the process of this invention include reduced crude, i.e., residuum from atmospheric and vacuum distillation, topped crude, and, in some instances, whole crude oil. In addition, the subject invention is particularly useful in removing asphalt from other petroleum fractions where the presence of asphalt is detrimental to downstream processing operations or to a finishing step for a final petroleum product. In addition, oils derived from tar sands, oil shale and other sources which contain appreciable quantities of asphalt may be satisfactorily processed by the process in the invention.

The processing equipment in which this invention can be practiced includes any of the solvent deasphalting processing equipment well-known in the art. Thus, contacting the mineral oil feed with the methanol deasphalting solvent may be conducted in one or more mixer-settler units or in a countercurrent liquid-liquid extraction column. Countercurrent contacting and separation of the liquid phases in the equipment commonly utilized in propane deasphalting may, of course, be employed. In a liquid-liquid extraction column, the asphalt-containing oil is introduced at an intermediate point in the column with the methanol fed into the bottom of the column so that it flows upwards through the column where it contacts the feed and forms the two liquid phases, one rich in oil, the other rich in asphalt. The asphalt phase flows downwardly and is removed from the bottom of the tower while the oil phase flows upwardly and is removed from the top of the tower. A conventional liquid-liquid contacting tower is provided with internals, such as packing, disk and donut trays, sieve-plate trays, and the like to promote effective contacting of the oil and the solvent.

The quantity of the methanol deasphalting solvent and the operating conditions utilized, particularly in the contacting tower, depend upon the particular oil feedstock being treated and the desired quality of the deasphalted oil product. Viscosity and carbon residue are often the critical parameters of the product oil. In general, it has been found that about 0.1 to about 20 volumes of methanol per volume of oil, preferably from about 0.5 to about 5 volumes per volume, may usefully be employed. The temperatures employed in this process are critical. Basically, the initial contacting of the methanol with the asphalt-containing oil is conducted at a temperature above 80° C. After the oil-rich and the asphalt-rich phases are formed and separated, the oil-rich phase is subjected to temperatures below 80° C. in order to effect a separation into an oil-rich alcohol-lean phase and an alcohol-rich phase. The initial contacting is conducted at a temperature above 80° C. up to a maximum of about 230° C., preferably at a temperature in the range of about 175° to about 225° C. The pressure utilized in this process must be selected so as to maintain the methanol in liquid form. Therefore, pressures in the range of about 50 to about 1500 psig, preferably about 500 to about 1200 psig are usefully employed.

Contacting the methanol with the asphalt-containing oil in accordance with this invention results in the formation of two phases which are separated within a liquid-liquid extraction column or, where a mixing vessel is employed, through the use of a settling tank. The asphalt-containing phase contains asphalt, oil and some methanol and often requires little if any purification unless a subsequent downstream treatment of this phase necessitates removal of the oil and/or the methanol. Methanol will normally constitute less than 5%, usually less than 2% of the asphalt phase. On the other hand, as much as 33–67% of the original feed stock may be found in the asphalt phase in the form of oil plus asphalt. Techniques such as flash vaporization and/or steam stripping, which are conventionally employed in solvent deasphalting, may be employed here to remove the methanol as required. Separation of the asphalt from the oil may require further processing including, perhaps, further solvent deasphalting.

The oil phase recovered from the extraction column or the settling tank is subjected to temperatures below 80° C. which surprisingly produces two liquid phases and effects a separation of the methanol from the oil. A temperature in the range of about 50° to about 75° F. is preferred for this separation. The pressure here is not critical so long as the methanol is maintained in the liquid state. The phase separation is complete enough here so that the methanol may be recycled for reuse in the process without the solvent purification which is often required in other solvent deasphalting processes. The oil phase upon recovery may be subjected to flash vaporization and/or steam stripping, as required, so as to provide the oil in the condition its downstream processing may require.

The methanol employed may be anhydrous. However, there is no objection to the methanol containing small quantities of water as long as the mixture as such retains the essential character of methanol. Preferably, the methanol contains less than about 5%, more preferably less than 1% water. Since the process of this invention does not require the usual solvent recovery purification of flash vaporization and/or steam stripping to produce the solvent for reuse in the process, the quality of the methanol should be continuously or periodically monitored before its reintroduction into the contacting tower, preferably at a point downstream from the point of introduction of fresh make-up methanol.

As pointed out herein, one of the principal advantages of this invention is that the methanol recovered from the oil-methanol phase may be reused without being subjected to flash vaporization and/or steam stripping. The methanol may be recovered for reuse from the methanol-oil solution by reducing the temperature of the solution to less than 80° C. Maintaining the solution at this temperature causes two phases to form. The separation between the oil and the methanol is quite sharp and essentially complete. The oil recovered has been completely deasphalted. In addition, where significant quantities of metals are present in the feed stream to the process of this invention, a significant reduction in metals content is concomitantly achieved. A metals reduction of 50 to 90% may be obtained by the process of this invention.

The separated oil and asphalt streams are obtained with very little contamination. In fact, the oil contains essentially no asphalt and only a slight amount of methanol. As pointed out above the oil has also been significantly demetallized in this process. The asphalt stream is likewise extremely pure containing only a slight amount of methanol. The small amounts of solvent and/or asphalt in the respective streams usually present no problems where further processing of the respective streams is required. However, where the particular downstream processing requires removal of even trace amounts of contaminants, the solvent and/or asphalt may readily be removed by utilizing flash vaporization and/or steam stripping, as required. Those skilled in the art can appreciate that purification of the streams is normally not required and this constitutes a significant advance over the usual processing steps in solvent deasphalting.

When practiced in a batch operation, the process of this invention involves introduction of the asphalt-containing mineral oil into a mixing chamber together with required quantities of methanol at temperatures in excess of 80° C. After adequate mixing, the mixture is introduced into a settling chamber where a hot phase separation takes place between an oil-rich phase and an asphalt-rich phase. The oil-rich phase is drawn off and its temperature is reduced to below 80° C. whereby a cold phase separation is achieved in a settling zone. Two liquid phases separate producing a methanol phase for recycle and an asphalt-free oil phase. The asphalt-free oil phase from the cold phase separation and the asphalt phase from the hot phase separation are then recovered. Where a continuous process is utilized, the mixing and hot phase separation may be achieved continuously by employing a liquid-liquid extraction column which inherently accomplishes the intimate contacting and hot phase separation required. The two streams drawn off from the tower are the asphalt-rich phase, which is recovered, and the oil rich phase which, following reduction in temperature to below 80° C., is introduced into a settling chamber, where it separates into two liquid phases, a methanol-rich, oil lean phase and an asphalt-free oil phase.

A preferred embodiment of this invention, which is practiced in a continuous deasphalting unit, will be described with reference to the FIGURE. An asphalt-containing mineral oil, such as an atmospheric or vacuum residual crude oil is introduced through line 2 into heater 4 which increases the temperature of the mineral oil to above about 80° C., usually about 175°–225° C. The heated mineral oil is introduced into countercurrent liquid-liquid extraction column 6 at a point in the middle portion of the column. Methanol, recycled from the downstream recovery system through line 8, is introduced near the bottom of tower 6 together with fresh make-up methanol supplied through line 10, as required. Heat exchanger 12 provides the methanol at the required temperature of from 175°–225° C. In column 6, the asphalt-containing oil is intimately contacted with the methanol to produce two liquid phases, an oil phase containing approximately ⅓ to ⅔ of the feed stock together with essentially all of the methanol and an asphalt phase containing about ⅓ to ⅔ of the feed stock which contains essentially all of the asphalt in the feed. The asphalt phase passes from the bottom of tower 6 through line 14 to storage or further downstream processing, as required.

The hot oil-methanol liquid phase passes from the top of column 6 through line 16 where it flows through a series of heat exchangers to reduce its temperature to below 80° C. The initial temperature reduction occurs in heat exchanger 18 where a stream of recycle methanol provides the initial temperature reduction. The partially cooled oil-methanol mixture then passes to heat exchanger 20 where cooling water reduces the temperature of the oil-methanol mixture to below 80° C., usually about 50°–75° C. The cooled stream of oil and methanol then flows through line 22 into separator 24 where the oil and methanol separate into two liquid phases. The lower oil phase is drawn off through line 26 to temporary storage or to further downstream processing. The separated methanol passes from separator 24 through line 28 for recycle and reuse in the liquid-liquid extraction column 6. The methanol flows through line 28 and heat exchanger 28 where the methanol is heated by indirect heat exchange with the higher temperature stream of oil and methanol. The recycled methanol then flows through line 8 and heat exchanger 12 where the temperature of the methanol is increased to the temperature required in extraction column 6.

The following example will serve to illustrate the subject invention.

One volume of Melones heavy crude, containing 16% asphaltenes and 468 ppm Ni and V, was contacted and mixed with two volumes of methanol at 215° C. under a pressure of 1000 psig. The two liquid phases which formed were separated at this elevated temperature to provide an asphalt-rich phase and a methanol-rich phase. When the methanol phase was removed and cooled to a temperature below 80° C. a second phase separation occurred to yield two liquid phases, a crude extract phase and a methanol phase. The crude extract fraction represented approximately one third of the total feed. This fraction contained no asphaltenes and only 126 ppm Ni V. The methanol phase contained essentially no asphaltenes or oil.

What is claimed is:

1. A process for deasphalting an asphalt-containing mineral oil which comprises:
   (a) contacting an asphalt-containing mineral oil at an elevated pressure and a temperature greater than about 80° C. with an amount of methanol effective to form two liquid phases, a deasphalted oil phase comprising a major amount of the methanol and an asphalt phase comprising a minor amount of the methanol, said pressure and said temperature being effective to maintain the methanol in the liquid phase,
   (b) separating the two phases, and
   (c) maintaining the deasphalted oil phase at a pressure and a temperature less than about 80° C. for a period of time sufficient to form two liquid phases, a methanol phase and a second deasphalted oil phase comprising a minor amount of methanol, said pressure and said temperature being effective to maintain the methanol in the liquid phase.

2. A process according to claim 1 including the following additional step:
   (d) recovering deasphalted oil from the second deasphalted oil phase of step (c).

3. A process according to claim 2 wherein step (d) comprises flash vaporization and/or steam stripping.

4. A process according to claim 1 wherein the methanol phase of step (c) is recycled to step (a) for reuse.

5. A process according to claim 1 including the following additional step:
   (e) recovering the asphalt from the asphalt phase.

6. A process according to claim 5 wherein step (e) comprises flash vaporization and/or steam stripping.

7. A process according to claim 2 wherein any methanol remaining in step (d) is recycled to step (a) for reuse.

8. A process according to claim 5 wherein any methanol remaining in step (e) is recycled to step (a) for reuse.

9. A process according to claim 1 wherein the amount of methanol in step (a) is about 0.1 to about 20 volumes of methanol per volume of mineral oil.

10. A process according to claim 1 wherein the temperature in step (a) is above about 80° C. up to about 230° C., the pressure in step (a) is about 50 to about 1500 psig, and the temperature in step (c) is below about 80° C.

11. A process according to claim 1 wherein the amount of methanol in step (a) is about 0.5 to about 5 volumes of methanol per volume of mineral oil, the temperature in step (a) is about 175° to about 225° C., the pressure in step (a) is about 500 to about 1200 psig, and the temperature in step (c) is about 50° to about 75° C.

* * * * *